March 3, 1964 W. N. KERNANDER ETAL 3,123,293
TIME METER ASSEMBLY
Filed Nov. 22, 1957 2 Sheets-Sheet 1

Inventors:
Clarence W. Camp
Warren N. Kernander
Carl F. VanBennekom
by Richard E. Hurley
Their Attorney Inventors:
Clarence W. Camp
Warren N. Kernander
Carl F. VanBennekom
by Richard E. Haley
Their Attorney

United States Patent Office 3,123,293
Patented Mar. 3, 1964

3,123,293
TIME METER ASSEMBLY
Warren N. Kernander, Lynchburg, Va., and Carl F. Van Bennekom, Lynnfield, and Clarence W. Camp, Lynn, Mass., assignors to General Electric Company, a corporation of New York
Filed Nov. 22, 1957, Ser. No. 698,091
8 Claims. (Cl. 235—103)

This invention relates to a time meter assembly and particularly to a time meter assembly capable of being mounted on a panel where observational readings are to be made in conjunction with operations utilizing said time meter.

A time meter, so-called, is an electric instrument designed to measure and indicate elapsed intervals of time. Measurement occurs when an indicating counting mechanism such as an odometer or the like having rotatable indicating means calibrated in selected increments of time is operated at a predetermined fixed rate of speed by a constant speed electric drive for a measurable interval of time. Reduction gearing drivingly connects the odometer and the electric drive and operates to effect a transformation of speeds.

Expanded utilization of time meters requires mounting on a panel. Such mounting, however, imposes a restriction on the size and weight while at the same time requiring good readability, ruggedness, and operational accuracy and efficiency over extended periods of time, oftentimes in unfavorable atmospheres. Heretofore, time meter devices comprised a multiplicity of parts in complicated arrangement which prevented low-cost manufacture and prevented design achievements which would produce high readability and ruggedness within a minimum volume consistent with compactness.

Therefore, it is an object of this invention to provide an improved time meter having a simplified assembly arrangement and a reduction in number of parts and which is capable of being produced in quantity at low factory cost.

It is also an object of this invention to provide an improved time meter assembly having increased readability while at the same time being more compact.

It is further an object of this invention to provide an improved time meter assembly which is more rugged and has high operational accuracy and efficiency.

Briefly stated, this invention provides for a time meter assembly in which an odometer, an electric drive assembly, and an intermediate drive connection are mounted independently on a unitary panel mounting member in fixed operative engagement. In one particular form, the unitary panel mounting member is a cast member and comprises a front wall portion and a bezel portion integral therewith. Extending outwardly from the front wall portion and integral therewith is a frame structure on which the odometer and the electric drive assembly are independently supported. The frame structure comprises a plurality of support projections certain of which independently supports the indicating means immediately adjacent a viewing aperture in the front wall portion and certain other of which independently support the electric drive assembly in spaced relation with the odometer. The intermediate drive connection is independently mounted and is maintained in fixed operative alignment. For that purpose, a plate member is provided which is mounted on the panel mounting member and coacts therewith in maintaining said operative alignment. In the preferred arrangement, the plate member is mounted on the same support projections as the electric drive and is located intermediate the electric drive and the odometer assembly.

In a particular aspect of my invention, the intermediate drive connection is a shaft having gear members attached thereto for rotation therewith. For rotatably supporting the shaft of the intermediate drive connection, the front wall portion is provided with a bearing recess and the plate member is provided with a suitable bearing opening, the bearing recess and bearing opening acting to support opposite ends of the shaft of the intermediate drive connection. Lug elements on the support projections of the integral frame coact with openings in the plate member to align the bearing opening and bearing recess whereby the operative position of the intermediate driving connection is fixed.

For utilization of the time meter assembly in an unfavorable atmosphere, the assembly is provided with a separate cover member adapted to enclose all of the operating elements and further adapted to be fittingly mounted into an annular groove in the front wall portion of the panel mounting member. The cover member is supported in assembled position preferably by suitable screw means which attach it to the drive assembly. Further and more complete enclosure of the assembly may be obtained by providing the viewing aperture of the front wall portion with a transparent pane which may be sealed in position within a front recess adjacent the aperture. Electrical connection is made within the cover member by suitable conductors leading from the electrical drive assembly to terminal means adapted to penetrate and to be supported on the cover member.

It will be appreciated from this description that the subject invention provides an improved time meter assembly which permits quantity production and low factory cost. By providing a unitary panel mounting member, the structure is greatly simplified thus reducing cost of fabrication and assembly. A unitary panel member also provides a rugged support capable of maintaining a fixed alignment of the operating elements thus assuring accurate and efficient operation over extended periods of use. It will be further appreciated that independent mounting of the operating elements and their intermediate connection makes possible the most favorable placement of the odometer adjacent the viewing aperture thereby increasing readability and, at the same time, permitting a high degree of design freedom which would enable an improvement in the compactness of the device.

Features of this invention which are believed to be novel are set forth in the appended claims with greater particularity. The invention itself may be better understood as to organization and construction as well as to further objects and advantages by reference to the following description taken in conjunction with the accompanying drawing in which:

Figure 1:
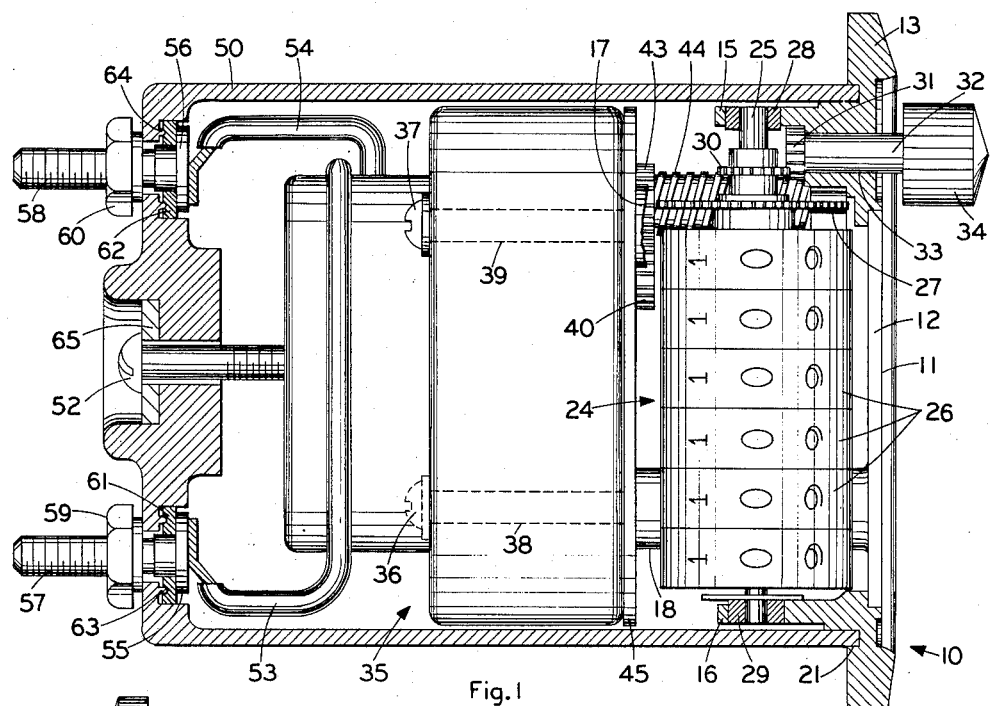
FIGURE 1 is a plan view of the time meter assembly with enclosing elements in half section.
Figure 3:
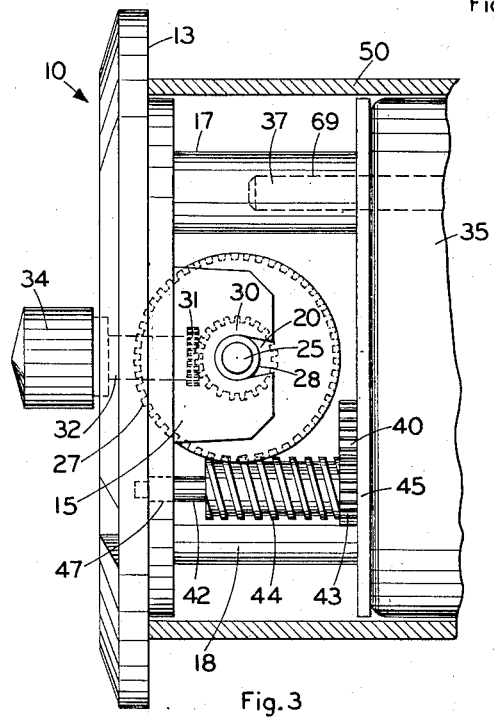
FIGURE 3 is a fragmentary side elevation of the drive connection of the time meter assembly of FIGURE 1.
Figure 2:
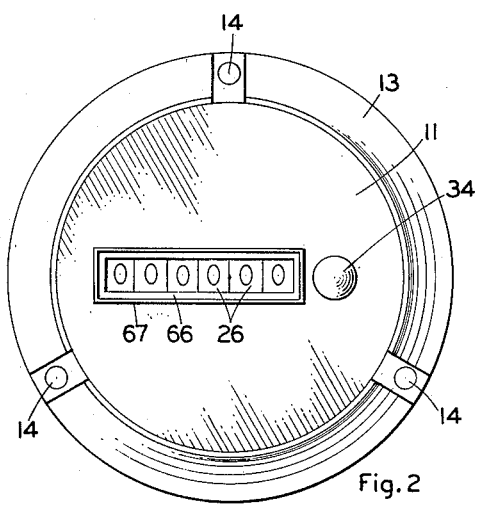
FIGURE 2 is a front view of the time meter assembly of FIGURE 1.
Figure 4:
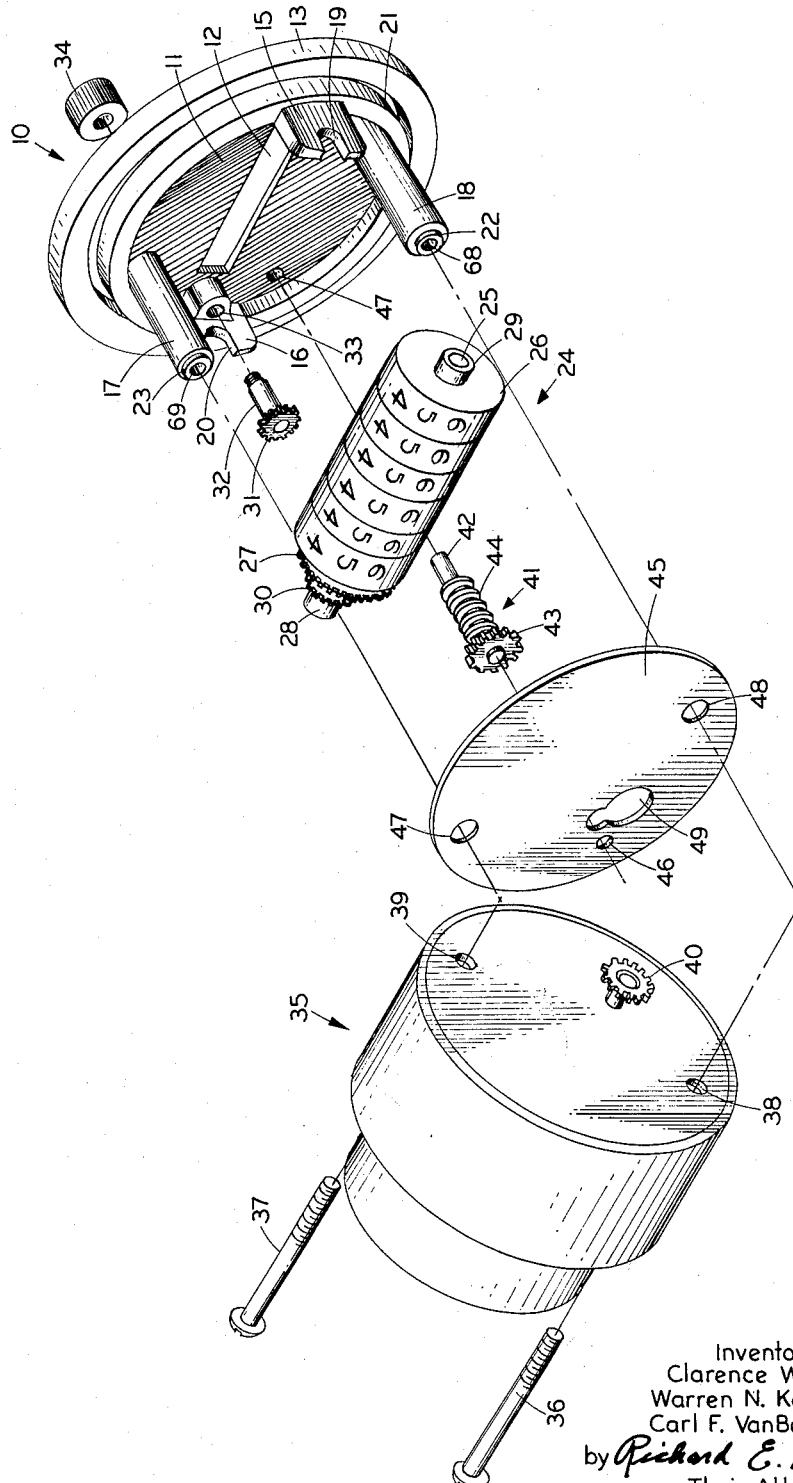
FIGURE 4 is an expanded isometric view of the time meter assembly of FIGURE 1, certain elements being omitted for clarity of illustration.

Referring to the drawing, there is disclosed in a preferred embodiment incorporating the features of this invention a time meter assembly comprising a unitary panel mounting member 10 having a front wall portion 11 through which is formed an elongate viewing aperture 12 and around which is a panel engaging peripheral bezel portion 13 integral therewith. As best seen in FIGURE 2, bezel portion 13 is provided with a plurality of spaced holes 14 for receiving suitable attaching means such as screws, not shown, for attaching the panel mounting member to a suitable panel. Rearwardly extending from the front wall portion and integral therewith is a frame structure preferably in the form of a plurality of support projections 15, 16, 17, and 18. Projections 15 and 16 which are located on opposite ends of aperture 12 are preferably flange-like to minimize space utilization consistent with desired rigidity and have mounting grooves 19 and 20 formed therein (see FIGURE 4). Projections 17 and 18 which are located on opposite sides of aperture 12 and out of alignment with support projections 15 and 16 are preferably post-like and are arranged to extend rearwardly beyond the extremities of support projections 15 and 16. The extreme ends of projections 17 and 18 are formed to have cylindrically shaped lugs 22 and 23 (see particularly FIGURE 4). An annular groove in the rear face of the front wall portion 11 encompasses the region which includes aperture 12 and support projections 15, 16, 17, and 18.

Mounted on panel mounting member 10 immediately adjacent aperture 12 for viewing therethrough is an odometer 24 of any suitable type having a shaft 25 on which are rotatably supported a plurality of indicating wheels 26 having their outer peripheral surfaces calibrated with suitable numerical indicia or the like. An operating gear 27 which is part of odometer 24 functions when driven to rotate wheels 26 in a manner characteristic of integrating counting mechanisms. Bearing means 28 and 29 on opposite ends of shaft 25 serve to support shaft 25 within mounting grooves 19 and 20 of support projections 15 and 16. Odometer 24 may be of the resettable type and for that purpose includes gear 30 which is in engagement with reset pinion gear 31 fixed to one end of shaft 32. An aperture 33 in front wall portion 11 provides a rotatable bearing support for reset shaft 32, one end of which protrudes beyond front wall portion 11. A knob 34 on the protruding end is provided to allow for manual resetting of odometer 24.

Also mounted on panel mounting member 10 independently and to the rear of odometer 24 is an electric drive 35. In the preferred embodiment, electric drive 35 is an assembled unit comprising a synchronous motor and speed reduction unit within a case from which extends drive gear 40.

Mounting of electric drive 35 in a fixed operative position vis-a-vis the odometer 24 is determined by the location of projections 17 and 18 to which it is attached. Attachment is obtained by screws 36 and 37 which pass through openings 38 and 39 in the casing of the electric drive 35 into threaded holes 68 and 69 in the ends of projections 17 and 18. Location of the openings 38 and 39 in the drive casing vis-a-vis the location of drive gear 40 and the disposition of projections 17 and 18 results in fixing the relative positioning of drive gear 40 and the operating gear 27 of odometer 24.

Driving connection between the independently mounted spaced odometer 24 with operating gear 27 and electric drive 35 with drive gear 40 is effectuated by gear connection 41 comprising a rotatable shaft 42 to which are attached a pinion gear 43 for engaging drive gear 40 and a worm gear 44 which engages operating gear 27. Independent mounting of the gear connection 41 is obtained by a plate member 45 mounted on panel member 10 and coacting therewith. For that reason, plate member 45 is provided with a bearing opening 46 for receiving one end of shaft 42 while front wall portion 11 is provided with a bearing recess 47 for receiving the opposite end of shaft 42. The position of bearing recess 47 is such that, when shaft 42 is in position, worm gear 44 meshes with operating gear 27 of odometer 24. Similarly, bearing opening 46 is located in plate member 45 so that, when shaft 42 is in opening 46, gear 43 meshes with drive gear 40. Attachment of plate member 45 is preferably made intermediate the electric drive 35 in odometer 24 through screws 36 and 37 passing through openings 47 and 48 in plate member 45. Tightening of screws 36 and 37 exerts force on casing of the electric drive 35 which in turn presses plate member 45 into abutment with the ends of projections 17 and 18. In such arrangement plate member 45 is provided with an enlarged opening 49 such as a keyhole through which is passed the pinion drive gear 40 for engaging pinion gear 43 on shaft 42. Openings 47 and 48 in plate member 45 are made sufficiently large so as to receive lugs 22 and 23 on the ends of projections 17 and 18 which act to fix the location of bearing opening 46 with respect to bearing recess 47.

Also supported on panel mounting member 10 and acting therewith to enclose the operative elements is cylindrical cover member 50 which is adapted to have the edge of its open end fit into annular groove 21. Holding cover member 50 in place is a suitable screw 52 which passes through an opening in the closed end thereof and then into a suitable threaded opening in the motor of electric drive 35. Electrical connection between electric drive 35 and a source of supply is made via conductors 53 and 54 connected to the enlarged head portions 55 and 56 of terminals 57 and 58. Retention of terminals 57 and 58 of cover member 50 is obtained by coaction of retaining nuts 59 and 60 and head portions 55 and 56 of terminals 57 and 58. Sealing of the terminal openings may be obtained by suitable washers 61 and 62 which are pressed between heads 55 and 56 and the inner surface of cover member 50. Annular ridges 63 and 64 on the inner surface of cover member 50 adjacent the terminal openings act to deform washers thereby filling the openings around the terminals. A washer 65 may also be provided to seal the opening around the attaching screw 52. A complete sealing of the entire assembly may be obtained by a suitable means placed within annular groove 21 to be compressed in any well-known manner by the edge of cover 50 under tightening of screw 52. Further sealing is accomplished on the front wall portion 11 of panel mounting member 10 by provision of a pane 66 sealed within a recess 67 around aperture 12.

In the manufacture of the time meter assembly of this invention, panel mounting member 10 is first die cast as a single piece from a suitable alloy such as zinc. At the same time, independent fabrication may be made of plate member 45 which is preferably a metallic member stamped according to shape and size and having openings 46, 47, 48 and keyhole 49 forms therein in a single operation. Independent operations may be conducted to assemble odometer 24, electric drive 35 and intermediate driving connection 41. Odometer 24 may be of any suitable type and is preferably any one of a large number of odometer mechanisms commercially available and having wide use in such applications as speedometers. Intermediate driving connection 41 is made by attaching worm gear 44 and pinion gear 43 on shaft 42. This may be done in any suitable manner but is preferably done by providing a force fit between shaft 42 and the gears mounted thereon. In the fabrication of panel mounting member, ruggedness and rigidity are achieved since bezel portion 13, projections 15, 16, 17, and 18, as well as front wall portion 11, are formed as a single unit. In addition, aperture 12, recess 67, grooves 19 and 20, and projections 15 and 16 may be formed at the time of die casting. Thus, it will be appreciated that the location of the projections 15, 16, 17, and 18 relative to aperture 12 produces a piece having a high accuracy in the arrangement of these parts to permit accurate arrangement without departing from conventional manufacturing tolerances of the odometer and electric drive to be mounted thereon. Subsequent to the die casting operation, panel mounting member 10 may be passed through a series of machining operations whereby threaded holes 68 and 69 are tapped into the ends of projections 17 and 18, lugs 22 and 23 are formed on the extreme ends of the same projections and annular groove as well as bearing recess 47 are cut into the front wall portion 11. Also, where a resetting mechanism is desired, aperture 33 for receiving reset shaft 32 may be drilled into wall portion 11. Location of the lugs 22 and 23, bearing recess 47, and aperture 33 are thereby accurately obtainable since the casting of panel mounting member 10 essentially fixes the location of all supporting parts. By casting panel mounting member 10, it is also possible to control to a fine degree, without undue emphasis on care and operation, the weight to be given to that member.

The preliminary fabrication and assembly having been completed, odometer 24 is mounted on flanges 15 and 16 by sliding the odometer in place with bearings 28 and 29 fitting into grooves 19 and 20. The ends of flanges 15 and 16 may thereafter be slightly compressed to reduce the end openings of the grooves, thereby causing flanges 15 and 16 to grip the bearings 28 and 29. With the odometer 24 mounted in position, panel mounting member 10 may then be placed face down whereupon gear connection 41 is mounted by inserting shaft 42 into recess 47 so that worm gear 44 operatively engages drive gear 27. Plate member 45 is then placed on mounting posts 17 and 18 with lugs 22 and 23 fitting into openings 47 and 48 so as to bring opening 46 into alignment for recessing the opposite end of shaft 42 thereby holding drive connection 41 in fixed operative position. Electric drive 35 is then brought into mounted position by passing drive gear 40 through enlarged portion of keyhole 49 and rotating the entire drive assembly clockwise to bring openings 38 and 39 into alignment with openings 68 and 69 in supports 17 and 18 and the already positioned openings 47 and 48 in plate member 45. In making such alignment, drive gear is brought into operative engagement with pinion gear 43 of gear connection 41. Fixed attachment of the plate member 45, electric drive 35, and drive connection 41 is then obtained by passing screws 36 and 37 through openings 38 and 39 and turning them into threaded openings 68 and 69 in posts 17 and 18. Thus, a rigid and compact assembly of a time meter is obtained. In the time meter assembly which utilizes a reset mechanism, the shaft 32 with pre-attached gear 31 is inserted through aperture 33 prior to assembly of odometer 24 to flanges 15 and 16 so as to bring gear 30 into operative engagement with gear 31.

The time meter assembly having been thus far completed, the entire assembly may be enclosed. In preparation for enclosure, conductors 53 and 54 of the electric drive 35 are attached at their respective ends to terminals 57 and 58. Sealing washers 61 and 62 are then placed over the ends of the terminals 57 and 58 and moved toward the connection until brought into engagement with heads 55 and 56. Cover member 50 is then slipped over the entire assembly following passage of terminals 57 and 58 through openings in the closed end of the cover member. Cover member 50 is then advanced forwardly until the open end is within annular groove 21 where a sealing agent, if desired, may be placed. Terminals 57 and 58 are then fixedly attached from the outside to cover member 50 and are so fixed as to cause deformation of seals 61 and 62 on annular ridges 63 and 64. Screw 52 is passed through a central opening in the end of cover member 50 into threaded opening in the electric drive 35 and upon tightening holds the cover member 50 firmly in place while, at the same time, compresses seal 65 in place. Pane 66 is then sealed in any suitable manner by a cementitious material or the like within recess 67 to complete the sealing of the time meter assembly. The entire assembly is thus prepared for mounting as a compact and rigid unit completely sealed against adverse atmospheric conditions on a suitable panel of any well-known type.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. An electric panel time meter assembly comprising a unitary panel mounting member having a front wall portion and a bezel portion integral therewith, said front wall portion having a viewing aperture therethrough and a plurality of integral support projections extending rearwardly from the front wall portion, indicating means comprising an odometer including a plurality of indicating wheels rotatably mounted on a shaft, the ends of said shaft being independently supported by bearing means on certain of said projections to position said indicating wheels immediately adjacent said aperture, substantially constant speed electrically operated driving means independently mounted on certain other of said projections in spaced separation from said indicating means, means forming a driving connection between said driving means and said indicating means including a separately mountable intermediate drive connection, and a plate member fixedly mounted on said certain other of said projections intermediate said driving and said indicating means and cooperating with said wall portion for supporting said intermediate drive connection in fixed operative engagement therebetween.

2. An electric panel time meter assembly comprising a unitary panel mounting member having a front wall portion and a bezel portion cast integral therewith, said front wall portion having a viewing aperture therethrough and a plurality of integral outwardly extending support projections, an indicating means assembly comprising an odometer including a plurality of calibrated indicating wheels rotatably mounted on a shaft, the ends of said shaft being independently supported by bearing means on certain of said projections to position said indicating wheels immediately adjacent said viewing aperture, a constant speed electric motor drive assembly independently supported in spaced separation from said indicating means assembly by certain other of said support projections, gear means forming a driving connection between said motor drive and said indicating means comprising first gear means forming part of said electric motor drive assembly, second gear means fixed to said shaft forming part of said indicating means assembly, and an intermediate gear assembly for connecting said first and second gear means, and a reset shaft extending through said front wall portion having a reset gear at the inner end thereof which selectively cooperates with the gear means secured to said shaft for resetting said odometer, and a bearing support in said front wall for rotatably supporting said reset shaft which passes axially therethrough.

3. A totally enclosed sealed panel time meter comprising a panel mounting member having a front wall portion, a bezel portion integral therewith, and an annular groove in the rear face of said wall portion, said wall portion having a viewing aperture therethrough and a plurality of rearwardly projecting integral supporting posts located within the region defined by said groove, indicating means and constant speed motor means independently mountable on said supporting means operatively connected in fixed operative alignment, said indicating means comprising an odometer including a plurality of calibrated indicating wheels rotatably mounted on a shaft, the ends of said shaft being mounted on said supporting means such that said wheels are immediately adjacent said aperture, cover means for enclosing said indicating means, said motor means, and said supporting posts, and fitting within said annular groove, and a transparent cover closing said aperture.

4. An electric panel time meter assembly comprising a unitary panel mounting member having a front wall portion and a bezel portion integral therewith, said front wall portion having a viewing aperture therethrough and a plurality of integral outwardly extending projections, an odometer assembly comprising a counting mechanism, a shaft for supporting said counting mechanism, and operating gear means for operating said counting mechanism to perform a counting function, said odometer assembly being independently supported by said shaft on certain of said mounting projections whereby said counting mechanism is disposed immediately adjacent said aperture, an electrically operated constant speed drive assembly independently supported by certain other of said projections in spaced separation from said odometer assembly, said drive assembly comprising an electric motor and a gear train operated thereby, said gear train having a drive gear spaced from said driven gear in a predetermined fixed relation, an intermediate gear assembly including a worm gear operatingly engaging said drive gear and said driven gear, and a plate member supported by said certain other of said projections which support said electrically operated drive assembly and cooperating with said panel mounting member to maintain said intermediate gear assembly in fixed operative engagement therebetween, said drive assembly and said other of said projections straddling a portion of said odometer in a plane transverse to the axis of said shaft.

5. In an electric panel mounted time meter having a driven odometer indicating means, an electrically operated drive means, and means for operatively connecting said driven and said drive means, including a separate intermediate drive connection, the improvement comprising a cast unitary panel mounting member having a front wall portion and a bezel portion integral therewith, said wall portion having an aperture therethrough and a plurality of integral outwardly extending projections for separately and independently supporting said odometer indicating means and said driving means respectively, said indicating odometer means comprising a plurality of indicating wheels rotatably supported by a shaft, said shaft in turn being supported by certain of said projections such that said wheels are positioned immediately adjacent said aperture, and means including a plate member mounted on certain other of said projections and cooperating with said wall portion for maintaining said intermediate connection in operative position and in fixed engagement with said indicating means and said drive means.

6. The electric panel time meter assembly structure as in claim 5 wherein said intermediate drive connection comprises a gear assembly including a rotatable shaft, said unitary support member front wall portion having a bearing recess therein for receiving one end of said shaft, said plate member has a bearing opening for receiving the other end of said shaft, and said outwardly extending projections have means for fixing the attitude of said plate member whereby said bearing recess and said bearing openings are in alignment.

7. In a panel mounted time meter, a unitary front panel mounting member having a front wall portion and a peripheral bezel portion integral therewith, said wall portion having a viewing aperture therethrough, flange means integral with said wall portion for supporting a driven odometer immediately adjacent said aperture, said odometer comprising a plurality of indicating wheels rotatably supported by a shaft, said shaft being supported in turn by said flange means, and rearwardly projecting post means integral with said wall portion for supporting an independently mountable constant speed drive motor means in an aligned driving connection with said driven odometer.

8. In a panel mounted time meter, a unitary front panel support member for supporting independently mountable driven odometer and constant speed driving means in fixed operatively connected alignment, said support member having a front wall portion and a bezel portion integral therewith and an annular recess in said front wall portion adjacent said bezel portion for receiving a cover member for enclosing said driven and driving means, said wall portion having a viewing aperture therethrough, a transparent cover closing said aperture, flange means integral with said wall portion for supporting said driven means immediately adjacent said aperture, said odometer comprising a plurality of indicating means supported by a shaft, said shaft being supported in turn by said flange means, and rearwardly projecting post means integral with said wall portion for supporting said driving means independent of the support for said odometer.

References Cited in the file of this patent
UNITED STATES PATENTS

| | | |
|---|---|---|
| 1,512,144 | Smithey | Oct. 21, 1924 |
| 2,044,049 | Bradley | June 16, 1936 |
| 2,100,024 | Dardani | Nov. 23, 1937 |
| 2,463,844 | Anderson | Mar. 8, 1949 |
| 2,551,179 | Spencer | May 1, 1951 |
| 2,650,757 | Weisinger | Sept. 1, 1953 |
| 2,652,199 | Miner et al. | Sept. 15, 1953 |
| 2,700,898 | Fragola et al. | Feb. 1, 1955 |